United States Patent Office 3,134,740
Patented May 26, 1964

3,134,740
CROSS-LINKED CHELATING RESINS
David P. Sheetz, Midland, Mich., assignor to The Dow Chemical Company, Midland, Mich., a corporation of Delaware
No Drawing. Filed Oct. 5, 1959, Ser. No. 844,199
6 Claims. (Cl. 260—2.1)

The present invention relates to water-insoluble cross-linked chelating resins and is more directly concerned with cross-linked polymeric chelating agents prepared from polyethylenimine and an unsaturated organic halide.

In the recovery and separation of metallic cations cross-linked chelate exchange resins showing highly selective behavior would offer many economic advantages but relatively few are known in the art. I have discovered new water-insoluble cross-linked chelating resins can readily be made from cheap starting materials in high yields by a very simple series of reactions.

The chelating resins of the present invention may be prepared by reacting polyethylenimine having a molecular weight of above 1000, preferably from 1000 to about 100,000, with a member of the group consisting of methallyl, allyl and vinylbenzyl halides, wherein the halogen atom is bromine or chlorine, in a mole ratio of organic halide to ethylenimine unit in the polymer of from about 1:1 to about 1:15, preferably at a mole ratio of about 1:10, at a temperature of from room temperature to 100° C., preferably at a temperature between 25° and 70° C. to produce the polyethylenimine substitution product containing polymerizable ethylenic unsaturation.

The resulting polymerizable unsaturated product is treated with a free-radical producing agent such as, for example, hydrogen peroxide, benzoyl peroxide, actinic radiation and the like at a temperature of from 5° to 95° C., preferably at about room temperature to initiate polymerization and produce a cross-linked, water-insoluble resin which is capable of separating metal ions in solution. The polymerization is carried out at a pH of less than 5, preferably at a pH of 1.5 to 4.5. If desired, the chelating resin may be carboxymethylated either before or after cross-linking to produce still other new and useful products.

The insoluble polymers of the present invention result from the free radical treatment or polymerization of ethylenically unsaturated derivatives of polyethylenimine and salts thereof, resulting from reaction of polyethylenimine with the ethylenically unsaturated organic halide. Such products have the recurring group

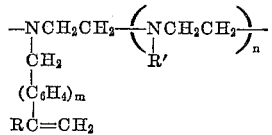

wherein $m$ is an integer from 0 to 1, $n$ is an integer from 0 to 15, R represents a member selected from the group consisting of —H and —CH$_3$, and each occurrence of R' individually represents a member selected from the group consisting of —H, —CH$_2$COOM and —C$_2$H$_4$COOM wherein M is a member of the group consisting of hydrogen and metals.

The present invention may be further illustrated, but is not to be construed as limited by the following examples:

EXAMPLE I

*Reaction of Polyethylenimine With Vinylbenzyl Chloride*

A mixture of 344 grams of 50 percent aqueous polyethylenimine having a molecular weight of about 50,000 and 61.0 grams (0.4 mole) of vinylbenzyl chloride was placed in a 500 milliliter 3-necked flask equipped with a stirrer and warmed to 45° C., whereupon an exothermic reaction started and the temperature rose to a maximum of 60° C. After cooling to room temperature, 229 grams (1.89 moles) of sodium chloroacetate was stirred into the mixture and the temperature again rose to 60° C. The mixture was cooled to 5° C. and 150 grams (1.88 moles) of 50 percent aqueous sodium hydroxide added portionwise with stirring at such a rate that the temperature was maintained between 50° and 70° C. The latter steps were then repeated with another 229 gram portion of sodium chloroacetate and 150 grams of 50 percent aqueous sodium hydroxide. The syrupy solution was diluted with water to three times its volume and concentrated aqueous hydrochloric acid added until a pH of 1.5 was reached whereupon the polymer precipitated. The supernatant liquid was removed by decantation and the resulting polyethylenimine derivative redissolved in enough water and concentrated aqueous ammonia to give a polymer solution containing 53 percent solids and having a pH of 2.4.

A dispersion agent was prepared by mixing 6 grams of 190 sq. m./gram silica, 0.45 milliliters of octadecyl trichlorosilane and 300 milliliters of Skelly solvent (B.P. 86° to 100° C.) for about 2 minutes on a Hamilton Beach mixer. A mixture of 0.5 milliliter of 30 percent aqueous hydrogen peroxide was added to a solution of 50 grams of the above polymer solution and immediately shaken vigorously with a mixture of 5.0 milliliters of the above dispersion in 100 milliliters of Skelly solvent and allowed to stand at room temperature. After 1 hour relatively hard water-insoluble beads were obtained. The beads were soaked in dilute caustic, washed with water, soaked in dilute sulfuric acid, thoroughly washed with deionized water until neutral to litmus and dried. A mixture of 2.000 grams of the dry beads with 20 milliliters of 1 M Cu(NO$_3$)$_2$, 20 milliliters of 1 M Ni(NO$_3$)$_2$, 20 milliliters of 1 M Co(NO$_3$)$_2$ and 20 milliliters of 20 percent aqueous sodium acetate was agitated at room temperature for 16 hours. The beads were removed by filtration, packed in a ½ inch I.D. column and washed with water until the washings were ion-free after which 100 milliliters of 1 N HCl was slowly run through the resin bed. The acid wash was diluted to 500 milliliters and analyzed for metallic ions by emission spectroscopy. These beads had a total capacity for Cu$^{++}$, Ni$^{++}$ and Co$^{++}$ ions of 2.71 millimoles per gram of isoelectric form of bead with a relative molar affinity of 1 part Cu$^{++}$ to 0.186 part Ni$^{++}$ to 0 part Co$^{++}$.

This experiment was repeated with polyethylenimine having a molecular weight of about 1300. Similar results were obtained.

EXAMPLE II

A mixture of 172 grams (2.0 moles) of 50 percent aqueous polyethylenimine and 172 grams water was placed in a 2 liter flask, heated to 65° C., and 30.5 grams (0.2 mole) vinylbenzyl chloride added with stirring over a period of 15 minutes. After an additional hour at 70° to 80° C., 100 milliliters of concentrated aqueous HCl was added. The resulting solution had a pH of 1.8. Hydrogen peroxide (1.0 milliliter of 35 percent aqueous) was added to 100 milliliters of the above solution and this mixture immediately shaken in a 500 milliliter Erlenmeyer flask with 100 milliliters of 86–100° C. Skelly solvent and 20 milliliters of the dispersion agent used in Example I. After standing at room temperature for 18 hours the polymer beads were removed from the solution and washed twice with 200 milliliter portions of acetone. They were then soaked for 1 hour in 1 liter of 5 N sodium hydroxide after which they were packed in a 2 inch column and washed with 1 liter of 0.1 N sodium hydroxide. Finally they were washed with deionized water until the washings were neutral to litmus and then dried. The yield of dry beads was 23.5 grams.

A mixture of 2.000 grams of the dry beads with 20 milliters of 1 M Cu(NO₃)₂, 20 milliliters of 1 M Ni(NO₃)₂, 20 milliliters of 1 M Co(NO₃)₂ and 20 milliliters of 20 percent aqueous sodium acetate was agitated at room temperature for 16 hours. The beads were removed by filtration, packed in a ½ inch I.D. column and washed with water until the washings were ion-free after which 100 milliliters of 1 N HCl was slowly run through the resin bed. The acid wash was diluted to 500 milliliters and analyzed for metallic ions by emission spectroscopy. The total capacity of the beads for $Cu^{++}$, $Ni^{++}$ and $Co^{++}$ ions combined was 3.02 millimoles per gram. These ions were chelated by the resin in the mole ratio of 1 part $Cu^{++}$, to 0.038 part $Ni^{++}$, to 0 part $Co^{++}$.

EXAMPLE III

*Reaction of Polyethylenimine With Allyl Chloride*

A mixture of 172 grams (2.0 moles) of 50 percent aqueous polyethylenimine and 15.3 grams (0.2 mole) of allyl chloride was placed in a flask and stirred vigorously. The temperature rose to 48.5° C. and then dropped to room temperature. An amber colored syrup was obtained. Ten grams of this syrup was treated with sufficient concentrated aqueous hydrochloric acid to bring the pH to 1.0 and 0.1 milliliter of 30 percent aqueous hydrogen peroxide added. Upon standing for 1 hour at room temperature a stiff gel was obtained which was useful as a chelating agent.

EXAMPLE IV

*Reaction of Equivalent Amount of Polyethylenimine With Allyl Chloride*

A mixture of 86 grams of 50 percent aqueous polyethylenimine, containing 1 gram equivalent of amino groups, and 86 grams of water was placed in a 500 milliliter 3-necked round bottom flask fitted with a sealed stirrer, water cooled reflux condenser, and dropping funnel and was stirred vigorously while 76.5 grams (1.0 mole) of allyl chloride was added over a period of 1 hour. After stirring for an additional 4½ hours heat was applied and the mixture heated at reflux 42–44° C.) for 7 hours. At this point 30 milliliters of 5 N sodium hydroxide were added and the mixture transferred to a pressure vessel where it was heated at 70° C. and agitated for 17 hours. A yellow syrup weighing 245 grams was obtained. The pH was 3.9 and the syrup had no odor of allyl chloride.

In a similar manner the treatment of polyethylenimine with methallyl bromide followed by carboxymethylation and/or peroxide treated gives a water-insoluble cross-linked polymer useful as a chelating resin.

Various modifications may be made in the present invention without departing from the spirit or scope thereof, and it is understood that I limit myself only as defined in the appended claims.

I claim:

1. A cross-linked, water-insoluble chelating resin obtained by the addition polymerization of an ethylenically unsaturated derivative of polyethylenimine, said derivative being prepared from polyethylenimine having a molecular weight of from about 1,000 to about 100,000 and consisting essentially of the recurring structure

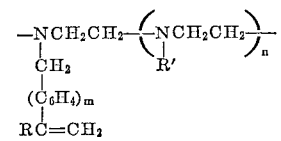

wherein $m$ is an integer from 0 to 1, $n$ is an integer from 0 to 15, R represents a member selected from the group consisting of —H and —CH₃, and each occurrence of R' individually represents a member selected from the group consisting of —H, —CH₂COOM and —C₂H₄COOM wherein M is a member of the group consisting of hydrogen and metals.

2. The product of claim 1 wherein $m$ is 0 and R and R' are hydrogen.

3. The product of claim 1 wherein $m$ is 1 and R and R' are hydrogen.

4. The product of claim 1 wherein $m$ is 1, R is hydrogen, and R' is —CH₂COOM.

5. The method of making a cross-linked, water-insoluble chelating resin which comprises:

(1) condensing polyethylenimine having a molecular weight of from about 1,000 to about 100,000 with at least one member of the group consisting of methallyl, allyl and vinylbenzyl halides having the halogen atom selected from the group consisting of bromine and chlorine, the mole ratio of said halide to polyethylenimine nitrogen being from about 1:1 to 1:15, and then (2) polymerizing the resulting ethylenically unsaturated derivative of polyethylenimine in the presence of a free-radical polymerization catalyst.

6. The method of claim 5 wherein the polyethylenimine is further modified by carboxymethylation to attach to at least 1 of every 15 nitrogen atoms thereof a

—CH₂COOM moiety wherein M is a member of the group consisting of hydrogen and metals.

References Cited in the file of this patent

Journal of Physical Chemistry, vol. 62, pp. 601–603, January–June 1958.